Figure 1:
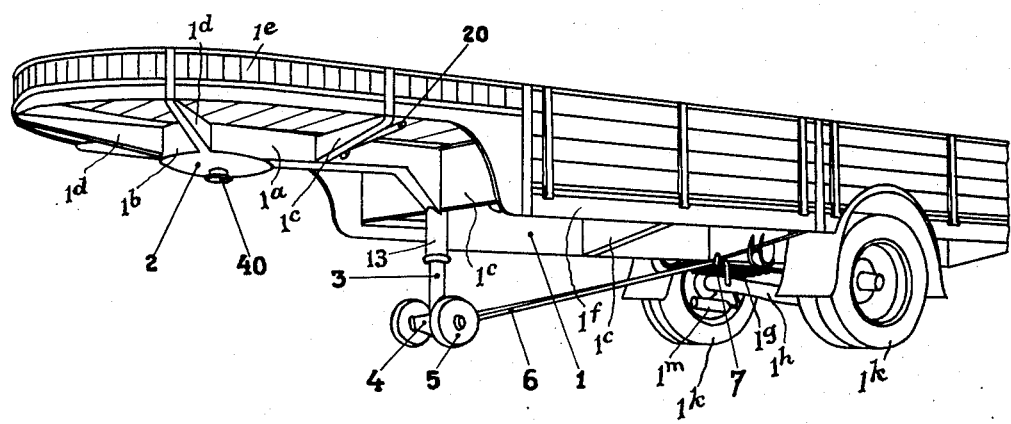

March 29, 1938.  H. J. VAN DOORNE  2,112,334
SUPPORTING DEVICE FOR THE FRONT PART OF A SEMITRAILER
Filed Nov. 16, 1936   2 Sheets-Sheet 2

Hubertus J. Van Doorne
INVENTOR

ATTORNEYS

Patented Mar. 29, 1938

2,112,334

UNITED STATES PATENT OFFICE 2,112,334

SUPPORTING DEVICE FOR THE FRONT PART OF A SEMITRAILER

Hubertus Josephus van Doorne, Deurne, Netherlands

Application November 16, 1936, Serial No. 111,146 In Great Britain November 15, 1935

15 Claims. (Cl. 280—33.1)

(Granted under the provisions of sec. 14, act of March 2, 1927; 357 O. G. 5)

The invention relates to a supporting device for the front part of a semi-trailer and has for its object to provide a supporting device of this kind by means of which the front part of the semi-trailer may be readily raised with respect to the tractor in order to disconnect both vehicles. A further object of the present invention is to provide a supporting device of such a kind that the support may be raised without manual force and further that this may be effected automatically by connecting the semi-trailer to the tractor.

The supporting device according to the invention comprises one or more supports which are adapted to be lowered hydraulically against the action of a spring and which after release of the liquid pressure, are raised again by said spring. According to the invention the support or supports may be a hydraulic cylinder which is movable within a jacket whilst the jacket and the hydraulic piston which co-operates with the cylinder are secured to the vehicle frame. By this construction it is possible to weld the longitudinal member of the vehicle frame and the part of the coupling device comprising the bearing plate to the jacket without danger of the force resulting from the load on the longitudinal frame member causing deformation of the hydraulic cylinder.

According to the invention the hydraulic pump may be provided with a large piston for first lowering the support or the supports and a small piston for subsequently lifting the car weight after the support or the supports have been brought into contact with the ground. The pump is made in such a way that the pump rod which forms the small piston may be connected with or disconnected from the large piston. Hence it is possible to lower the support or the supports quickly and the trailer may be readily lifted from the tractor in order to disconnect both vehicles without any great effort.

The device according to the invention may be such that by opening the suction and delivery valves of the hydraulic pump the spring acting on the support or supports may raise the same and the liquid be driven back to the tank. The member which is adapted to open the valves may be operated by an element which is adapted to be moved by the device for coupling the semi-trailer to a tractor, so that by coupling both vehicles the support or the supports are automatically raised.

The drawings illustrate by way of example an embodiment of a device according to the invention.

Figure 3:
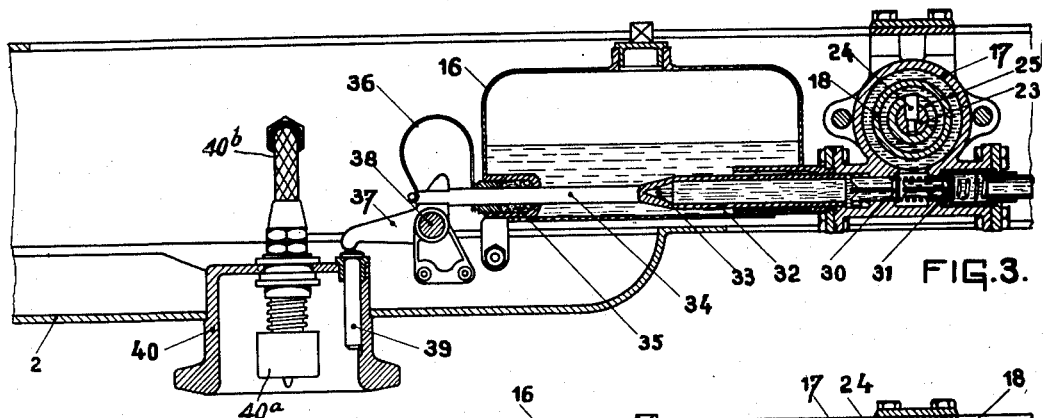
Figure 4:
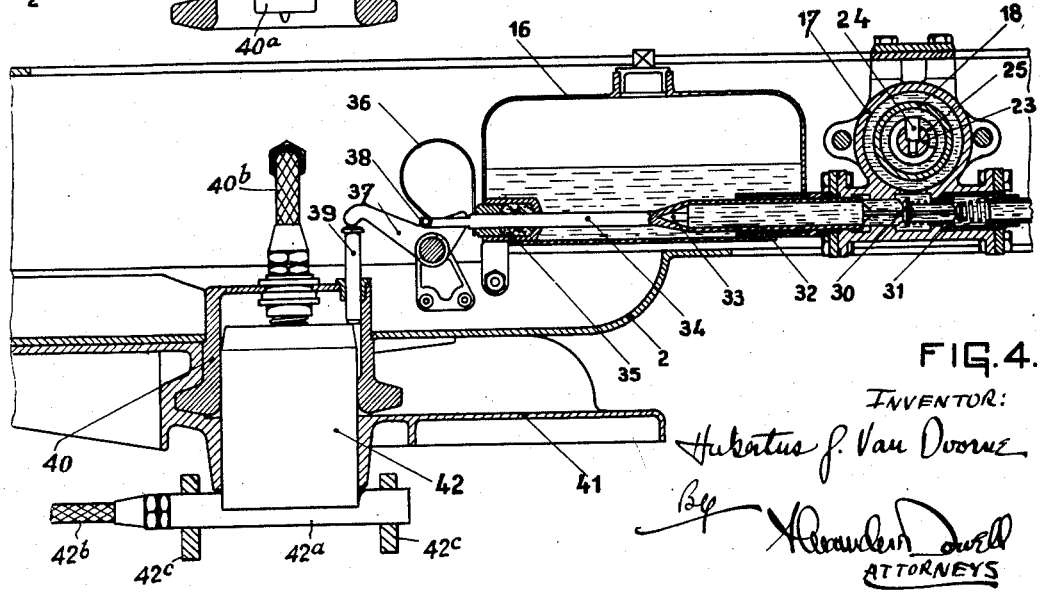
Figures 2, 5, 6:
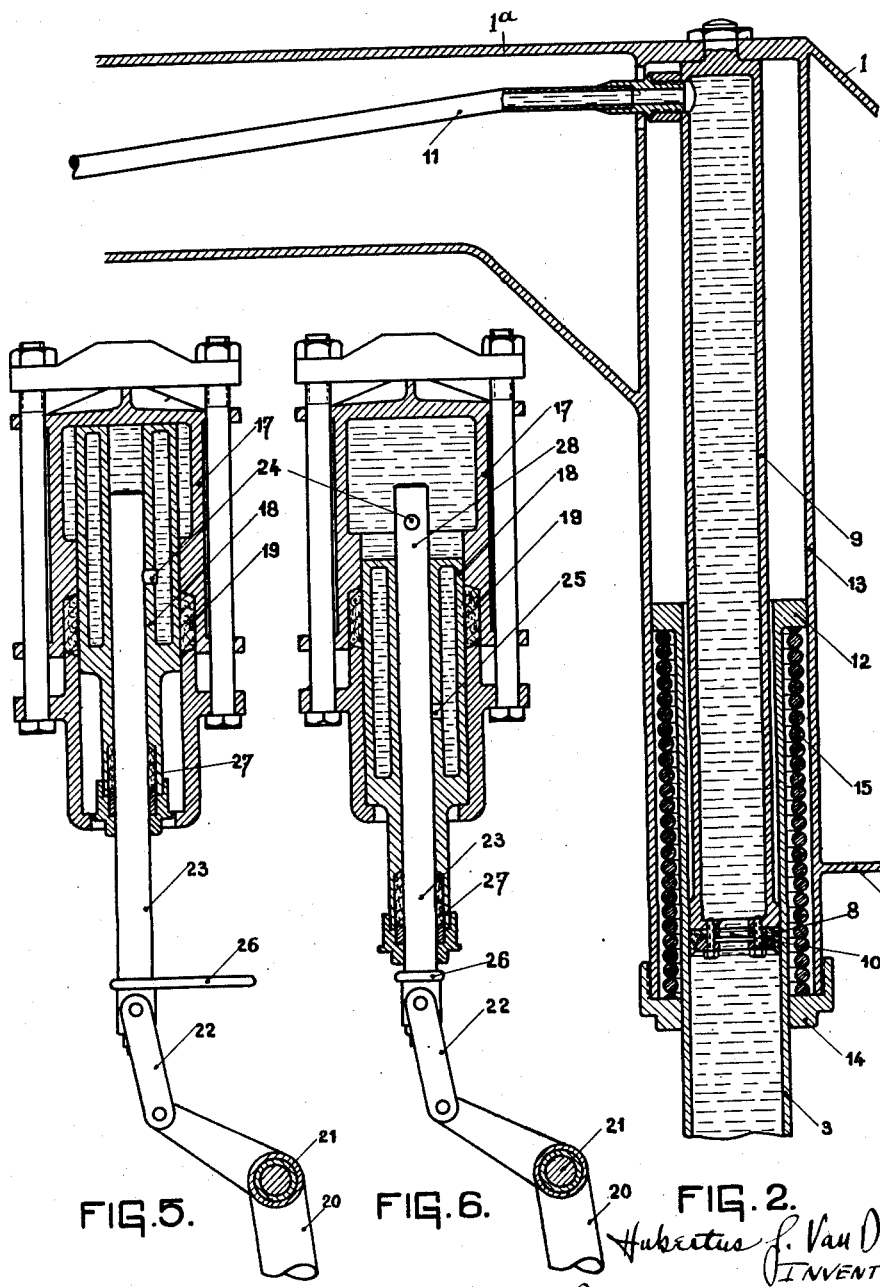

Figure 1 is a bottom perspective view of a semi-trailer with a supporting device according to the invention, Figure 2 is a sectional elevation through the guide for the support and through the hydraulic cylinder, Figures 3 and 4 are sections through the front part of the main frame and through the hydraulic pump, and Figures 5 and 6 are horizontal sections through the hydraulic pump.

The semi-trailer shown in Figure 1 comprises a frame consisting of a longitudinal main beam 1 and side members 1f connected by cross beams 1c as shown preferably joined together by welding. The front end of beam 1 is welded to a cylindrical casing 13 which in turn is welded to the rear end of a longitudinal beam 1a forming a continuation of beam 1, but of less depth than beam 1, said beam 1a having an enlargement 1b forming a bearing surface 2 of the coupling device, said enlargement 1b being disposed substantially axially of the rounded front end of the frame. The side members 1f of the frame are reduced in depth and rounded at their front ends on a radius coaxial with the enlargement 1b, and cross beams 1c connect the casing 13, and beam 1a with the side members 1f; also radially disposed beams 1d connect the enlargement 1b with the side members. Upon the top of the frame are floor boards 1e. Bearing surface 2 is adapted to bear on the corresponding surface of the tractor (not shown). The rear end of the frame is supported on an axle 1h connected by springs 1g to the frame and carrying road wheels 1k which may be braked by pressure or vacuum operating in cylinders 1m in the usual manner. When the trailer is disconnected from the tractor the front end of the frame is supported by a leg 3 carrying a pivoted axle 4 and supporting rollers 5. A tongue 6 which is connected to the axle 4 may be used to draw and to steer the uncoupled trailer if the same must be moved. When not in use tongue 6 may be conveniently supported by a hook 7.

The support 3 is in the form of a hydraulic cylinder (Fig. 2) co-operating with a piston 8 which is secured to the vehicle frame by means of a tube 9. An opening 10 in the piston 8 allows the liquid to be fed under pressure from a pump through the conduit 11 through tube 9 and into the cylinder 3 so that the latter will be forced downwardly.

The upper end of cylinder 3 is provided with a flange 12 which is guided in the casing 13 of the frame. A cap 14 is secured to the lower end of casing 13 and serves as a lower guide for the cylinder 3 when the support is raised or lowered.

A compression spring 15 is arranged between the flange 12 and cap 14. When by means of the hydraulic pump the cylinder 3 is forced downwardly, spring 15 is compressed, while upon releasing the liquid pressure spring 15 raises the cylinder 3 into inoperative position.

A pump and a tank 16 are arranged within the front part of the longitudinal member as shown in Figs. 3 and 4. The pump comprises a cylinder 17 in which a piston 18 is slidably arranged, leakage being prevented by a stuffing box 19 (Figs. 5 and 6).

Piston 18 is operated by means of a hand lever 20 which is pivoted on a pin 21 and connected with a pump rod 23 by means of a link 22. Pump rod 23 is provided with a stud 24 which may engage a slot 25 in the inner part of the piston 18 and move the latter with it.

By means of a handle 26 the pump rod may be turned through 90 degrees. If by doing so the stud 24 is turned upwards (Figures 3, 4 and 6) the stud leaves the cross slot 25 and may slide in a longitudinal slot (not shown) of the piston 18, and thus the rod 23 may reciprocate independently of piston 18, the pump rod sliding through a stuffing box 27 arranged in an extension of the piston. When the pump rod is thus turned the piston is prevented from following this movement by a stud (not shown) which is adapted to reciprocate in a slot of the pump casing.

If it is desired to lower the cylinder 3 against the action of the spring 15 the handle 26 is brought into such a position that the stud 24 engages the cross slot 25. The hand lever 20 is now operated and upon each stroke of the piston 18 a relatively large amount of liquid is displaced through the pipe 11 into the tube 9 and the cylinder 3 is lowered quickly until the supporting rollers 5 are in contact with the ground. Then the lever 20 is brought into the outermost position and the handle 26 is turned (Figure 6) so that the stud 24 leaves the cross slot 25 and the piston 18 is released. If now the lever 20 is operated again the pump rod 23 will reciprocate and its free end 29 will act as a plunger. Upon each stroke of said plunger a small amount of liquid is displaced with great force so that the trailer weight is lifted from the tractor and the latter may be driven away.

A suction valve 30 is arranged between the tank 16 and the pump cylinder 17 and a delivery valve 31 is arranged between the cylinder 17 and the conduit 11. The suction tube 32 which by an opening 33 communicates with the tank 16, is provided with an extension rod 34. This rod projects beyond the tank through a stuffing box 35 and is urged outwardly by a spring 36. A bell crank lever 37 which is fixed to a shaft 38 engages with one arm the fork-shaped end of the rod 34, the other arm of said lever bearing on the head of a bolt 39. This bolt is slidably arranged in the sleeve 40 of the coupling device.

If the tractor is driven under the trailer the coupling part 41 which is fixed onto the tractor engages the sleeve 40 and its collar throughout an arc of about 180 degrees (Fig. 4). A pivot 42 is slidably arranged in the part 41 so that the same may be shifted into the sleeve 40. By this movement the bolt 39 is raised so that the bell crank lever 37 moves the rod 34 and the tube 32 opens the suction and delivery valves 30, 31.

Thereby the pressure in the system is released and the spring 15 raises the cylinder 3 by which the liquid is forced back into the tank 16. Hence by coupling the tractor and the trailer the support is automatically raised.

A tube 42a is welded to the coupling pin 42 and is closed at one end. The other end is connected with the brake control valve by a flexible tube 42b. Within the hollow coupling pin 42 there is a vertical tube (not shown) which is connected with tube 42a. When the coupling pin 42 is shifted into its uppermost position the vertical tube is automatically connected with a member 40a fixed to the bottom of sleeve 40 and connected by a tube 40b with the brake cylinders 1m. The coupling pin may be shifted by means of two forks 42c engaging tube 42a.

Thus the coupling pin 42 of the tractor may be disposed in three positions:

(1) Retracted position in which the upper end of the pin 42 is flush with the bearing plate of the tractor marked 41 (Fig. 4);

(2) An intermediate position in which pin 42 engages sleeve 40 of the trailer to maintain the two vehicles in coupled relation while said pin 42 remains raised an extent insufficient to raise bolt 39 enough to cause tube 32 to open the valves 30 and 31; and (3) A fully engaged position (Fig. 4) in which the valves 30 and 31 are opened so that the spring 15 may raise the cylinder 3 forcing the liquid from the cylinder back into the tank 16.

When the tractor is to be disconnected from the trailer the driver shifts the coupling pin by operating fork 42c from the fully engaged position to the intermediate position above described. The valves 30 and 31 are then closed by their respective springs, and by setting handle 26 and operating the handle 20 the cylinder 3 may be quickly pumped down by piston 18 until the wheels 5 touch the ground. Thereupon the handle 26 is shifted to disconnect the piston 18 and the front part of the trailer is readily lifted by using the small plunger 28 of the pump so that the tractor is relieved from the weight of the trailer. Now the driver fully retracts the coupling pin 42 and drives the tractor away.

It may be desired to lower the front end of the trailer a small amount while the same is disconnected from the tractor. For this purpose the shaft 38 extends beyond the head of the frame member 1 and is provided with a square head which may be turned by means of a spanner. This square head must be arranged in a place which is not too easily accessible and may not extend beyond the frame in order to prevent the shaft 38 being turned by any unauthorized person.

The embodiment shown in the drawings is especially adapted to support a semi-trailer with a central longitudinal beam. In a construction of this kind the support is preferably arranged under this main beam. For trailers with a frame comprising two longitudinal beams at the sides the support may be arranged under a cross beam; it is also possible to arrange two supports, each of which is arranged under one of the side beams.

Having thus described the invention, what is claimed as new is:—

1. In a semi-trailer having a frame provided with a coupling member adapted to engage a complementary coupling member on a towing vehicle; a supporting leg on the frame; yieldable means normally tending to raise the leg above the ground surface; means for lowering the leg into engagement with the ground; means for maintaining the leg in said lowered position when the coupling members are partially engaged; and normally inactive means actuated by engagement of coupling members for releasing the maintaining means to permit the leg to rise.

2. In a semi-trailer as set forth in claim 1, one coupling member having a pin adapted to enter a recess in the other member; means for shifting the pin; and said releasing means including a member within the recess adapted to be actuated by the pin when fully entered into the recess.

3. In a semi-trailer as set forth in claim 1, one coupling member having a recess, and the other coupling member a pin; means for entering and retracting the pin with respect to the recess; and said releasing means including a member extending within the inner end of the recess and adapted to be actuated by the pin when the latter is fully entered into the recess, whereby when the pin is retracted and only partly entered in the recess the releasing means will be inactive.

4. In a semi-trailer having a frame provided with a coupling member adapted to engage a complementary coupling member on a towing vehicle; a piston mounted on the frame; a cylinder cooperating with the piston and forming a supporting leg; yieldable means normally tending to raise the leg above the ground surface; a pressure pump; a conduit connecting the pump and cylinder for creating pressure with the cylinder to lower the leg into engagement with the ground; a normally closed pressure valve in said conduit for holding said pressure medium in the cylinder; and normally inactive means actuated by engagement of the coupling members for opening said valve and conduit to permit the leg to rise.

5. In a semi-trailer as set forth in claim 4, one coupling member having a pin adapted to enter a recess in the other coupling member; means for shifting the pin; and said releasing means including a member within the recess and adapted to be actuated by the pin when fully entered into the recess.

6. In a semi-trailer as set forth in claim 4, one coupling member having a recess, and the other coupling member a pin; means for entering and retracting the pin with respect to the recess; and said releasing means including a member extending within the inner end of the recess and adapted to be actuated by the pin when the latter is fully entered into the recess, whereby when the pin is retracted and when only partly entered in the recess the releasing means will be inactive.

7. In a semi-trailer as set forth in claim 4, said releasing means comprising a tank connected in said conduit; a normally closed relief valve in the connection; and a member simultaneously opening the pressure and relief valves when the coupling members are engaged.

8. In a semi-trailer as set forth in claim 4, said piston being hollow and forming part of said conduit.

9. In a semi-trailer as set forth in claim 4, a cylindrical guide for the cylinder disposed around the piston and forming part of the frame.

10. In a semi-trailer as set forth in claim 4, a cylindrical guide for the cylinder disposed around the piston and forming part of the frame; and said yieldable means comprising a compression spring within the guide interposed between a reduced portion at the lower end of the guide and an enlarged portion at the upper end of the cylinder.

11. In a semi-trailer as set forth in claim 4, means for manually stroking said pump; and means for adjusting the pump delivery per stroke whereby upon one adjustment the leg may be lowered quickly into contact with the ground, and thereafter upon another adjustment the trailer may be raised with minimum effort.

12. In a semi-trailer having a frame provided with a recessed bearing surface adapted to be engaged by a pin on the complementary bearing surface of a towing vehicle; a supporting leg on the frame; yieldable means for normally raising the leg above the ground surface; means for lowering and locking the leg in engagement with the ground; means for entering and retracting the pin with respect to the recess; and a member for releasing the locking means extending within the inner end of the recess and adapted to be actuated by the pin when fully entered into the recess to permit the leg to rise.

13. In a semi-trailer having a frame provided with a coupling member adapted to engage a complementary coupling member on a towing vehicle; a supporting leg mounted on said frame; yieldable means for normally raising the leg above the ground surface; a pressure pump; a fluid cylinder adapted to lower said leg; a conduit connecting the pump and cylinder for delivering pressure medium into the cylinder; a normally closed pressure valve in said conduit for holding pressure developed in the cylinder; a tank connected in said conduit; and a normally closed relief valve in said connection; and a member simultaneously opening the pressure and relief valves when the coupling members are engaged to release the pressure from the cylinder into the tank, thereby permitting the leg to rise.

14. In a semi-trailer as set forth in claim 13, one coupling member having a recess, and the other coupling member having a pin; means for entering and retracting the pin with respect to the recess; and said releasing member extending within the inner end of the recess and adapted to be actuated by the pin when fully entered into the recess, whereby when the pin is retracted and when only partly entered therein the releasing member will be inactive.

15. In a semi-trailer as set forth in claim 13, means for manually stroking said pump; and means for adjusting the pump delivery per stroke whereby in one adjustment the leg may be lowered quickly into contact with the ground, and thereafter when in another adjustment the trailer may be raised with minimum effort.

HUBERTUS J. v. DOORNE.